(12) United States Patent
Finkler

(10) Patent No.: US 8,020,310 B2
(45) Date of Patent: Sep. 20, 2011

(54) MEASURING ELEMENT COMPRISING A TRACK USED AS A MATERIAL MEASURE AND CORRESPONDING MEASUREMENT METHOD CARRIED OUT BY MEANS OF SUCH A MEASURING ELEMENT

(75) Inventor: Roland Finkler, Erlangen (DE)

(73) Assignee: Siemens Aktiengesellshaft, Munich (DE)

( * ) Notice: Subject to any disclaimer, the term of this patent is extended or adjusted under 35 U.S.C. 154(b) by 270 days.

(21) Appl. No.: 12/311,711

(22) PCT Filed: Sep. 6, 2007

(86) PCT No.: PCT/EP2007/059319
§ 371 (c)(1),
(2), (4) Date: Apr. 9, 2009

(87) PCT Pub. No.: WO2008/043614
PCT Pub. Date: Apr. 17, 2008

(65) Prior Publication Data
US 2010/0011603 A1 Jan. 21, 2010

(30) Foreign Application Priority Data
Oct. 13, 2006 (DE) .......................... 10 2006 048 628

(51) Int. Cl.
*G01D 5/249* (2006.01)
*G01D 5/245* (2006.01)
*G01B 21/02* (2006.01)

(52) U.S. Cl. ............................. 33/706; 33/1 PT; 341/13

(58) Field of Classification Search ................... 33/1 PT, 33/706, 707, 708; 356/616, 617, 621; 341/3, 341/9, 13, 14, 15
See application file for complete search history.

(56) References Cited

U.S. PATENT DOCUMENTS

| | | | |
|---|---|---|---|
| 4,225,931 A | | 9/1980 | Schwefel |
| 4,628,609 A | * | 12/1986 | Rieder et al. ..................... 33/707 |
| 4,631,519 A | | 12/1986 | Johnston |
| 4,965,503 A | * | 10/1990 | Watanabe et al. ............ 318/671 |
| 5,279,044 A | | 1/1994 | Bremer |
| 5,563,408 A | * | 10/1996 | Matsumoto et al. ..... 250/231.14 |
| 6,941,192 B2 | * | 9/2005 | Tang et al. ..................... 700/254 |
| 7,242,182 B2 | | 7/2007 | Finkler et al. |
| 2004/0187625 A1 | * | 9/2004 | Schiel et al. .................... 74/514 |

FOREIGN PATENT DOCUMENTS

DE 27 29 697 A1 1/1979

(Continued)

OTHER PUBLICATIONS

Finkler et al., Verfahren und Vorrichtung für Positionsmessung mit mehr als zwei Sorsoren, Feb. 25, 2005, Defensive publication.

*Primary Examiner* — Richard A Smith

(57) ABSTRACT

A measuring element with a circular or linear track that encompasses a material measure and a number of sensors for scanning the track is disclosed. At least two scanning heads having the sensors are provided for scanning the track. The track of the measuring element has at least one first and a second partial track which are each provided with a first and a second grating period. For each grating period, one of the scanning heads is equipped with a sensor array that is adjusted to the grating period.

17 Claims, 2 Drawing Sheets

FOREIGN PATENT DOCUMENTS

| | | |
|---|---|---|
| DE | 41 23 722 A1 | 1/1992 |
| DE | 102 38 671 A1 | 9/2003 |
| DE | 10 2004 004 099 | 7/2005 |
| DE | 10 2004 062 278 A1 | 7/2006 |
| DE | 10 2004 004 100 | 2/2007 |
| EP | 0 116 636 B1 | 8/1988 |
| EP | 0 530 176 A1 | 3/1993 |
| EP | 0 503 716 B1 | 9/1997 |
| WO | WO 89/11080 A1 | 11/1989 |
| WO | WO 2005/119179 A1 | 12/2005 |

* cited by examiner

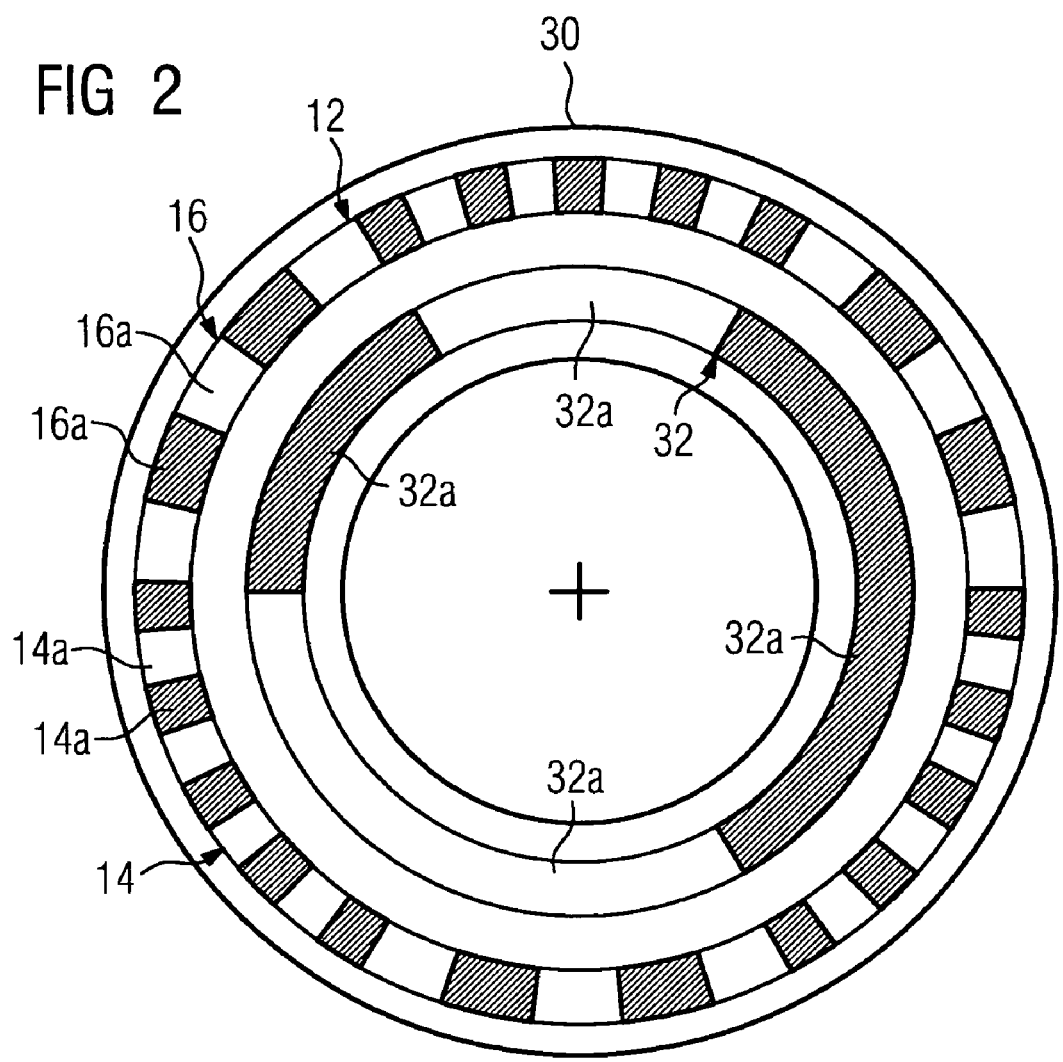

MEASURING ELEMENT COMPRISING A TRACK USED AS A MATERIAL MEASURE AND CORRESPONDING MEASUREMENT METHOD CARRIED OUT BY MEANS OF SUCH A MEASURING ELEMENT

CROSS REFERENCE TO RELATED APPLICATIONS

This application is the US National Stage of International Application No. PCT/EP2007/059319 filed Sep. 6, 2007 and claims the benefit thereof. The International Application claims the benefit of German Patent Application No. 10 2006 048 628.5 DE filed Oct. 13, 2006, both of the applications are incorporated by reference herein in their entirety.

FIELD OF INVENTION

The invention relates to a measuring element with at least one track, with the track featuring a material measure. The invention further relates to an appropriate measurement method.

BACKGROUND OF INVENTION

Sensors are used for determining a position, especially an absolute position, e.g. a machine axis or the like, for example in a machine tool, production machine and/or a robot. In such cases commercially available sensors for detection of the location, i.e. the position, feature a measuring element which can be present as a linear element or as a rotational element, with the measuring element having one or more tracks with a respective material measure in the form of increments, which are scanned by sensors for determining the position.

European patent application 0 116 636 discloses sensor, in which an absolute position is determined using a so-called PRBS track, featuring increments in the form of "zeros" and "ones". An additional fine resolution of the absolute position is undertaken using a detection of the position of the transitions between the increments. In this case the disadvantage arises of on the one hand additional sensor systems being needed for detecting the transitions and on the other hand of eight or more sensors usually being needed for determining the position.

European patent application 0 503 716 discloses a sensor for determining an absolute position, with an absolute track and an incremental track being combined as a material measure to form a single composite track, with the absolute track being design such that its individual increments are distributed pseudo-randomly In this case the disadvantage is that eight or more sensors are usually needed to be able to determine the position.

A length measurement system is known from EP 0 530 176 A1, in which an incremental track and an absolute track are used as a material measure for determining a position, with the absolute track being used for the rough detection of the position and the additional evaluation of the incremental track finally delivering a more precise position value.

The basic principle of a sin/cos sensor is known from German application 27 29 697.

Known from German patent applications 10 2004 004 099 and 10 2004 004 100 are position sensors for detecting the position of a rotation body and corresponding measurement methods. Known from DE 10 2004 062 278 is a measuring element with a track, with the track having a material measure which is sampled by at least two sensors for determining a position, with the material measure being embodied such that the sensors output as their respective output signal a modulated sine-wave track signal for determining the position.

A rotary sensor for a combination drive is known from the German publication "Drehsensor für einen Kombinationsantrieb (Rotary sensor for a combination drive", www.ip.com, IPCOM000028605D, Christoph Nolting, Hans-Georg Köpken, Günter Schwesig, Rainer Siess.

An absolute value encoder is known from DE 41 23 722 which comprises a code plate with a single-track absolute value pattern, a first incremental pattern with a first period and a second incremental pattern with a second period, with the smallest read unit of the single track absolute value pattern corresponding to the first period and the second period by a factor which is an integer power of two, is smaller than the first period. A detector section is movable relative to the code plate and contains a device for detecting the absolute value pattern in order to create an absolute value sample signal. With a device for detecting the first incremental pattern a first incremental pattern signal is created and with a device for detecting the second incremental pattern a second incremental signal is created. A shorter incremental sample signal in the cycle is generated by interpolation from the first incremental sample signal and this is synchronized with the second incremental sample signal. The absolute value sample signal, the second incremental sample signal and the synchronized first incremental sample signal represent the relative position relationship between the code plate and the detector section.

Furthermore a position-encoded sensor is known from 89/11080, in which for creation of a position-encoded signal at any time, two tracks are sampled by means of two sensors, which each create a sine-wave signal pair or a similar periodic signal with a phase position defined at any time, the period length of which behaves as m/(m−1), so that a sought relative distance is produced from a difference between the two phase positions.

Finally reference is also made to the prior art in the German publication entitled "Verfahren und Vorrichtung für Positionsmessung mit mehr als zwei Sensoren (Method and facility for position measurement with more than two sensors)", www.ip.com, IPCOM000035541D, Roland Finkler, Hans-Georg Köpken, to which particular reference will be made later in this application.

SUMMARY OF INVENTION

One object of the present invention lies in specifying a simple measuring element and a simple measurement method for determining a position, especially an absolute position.

The object is achieved by a measuring element as claimed in the claims. To this end, in a measuring element with a track comprising a material measure and a number sensors scanning the track of at least two scanning heads comprising the sensors movable relative to the track are provided, with the track comprising at least one first and one second partial track with respectively one first and one second grating period and, for each grating period occurring, one of the scanning heads featuring a sensor arrangement matched to this measurement period.

The object is also achieved by a measurement method as claimed in the claims. To this end there is provision for one or more decision signals which are formed from the signals of the individual sensors, to be evaluated in relation to the fulfillment of predetermined or predeterminable criteria. The ability of specific criteria to be fulfilled depends in this case on an appropriate relationship between grating period and sensor arrangement. As soon as it is detected which of the criteria are fulfilled, the position of a machine axis for example can be determined with reference to the sensor signals.

The measuring element and the measurement method have the advantage that they allow the determination of the absolute position within one complete revolution or the complete range of travel of a linear axis with basically with only one individual track operating as a material measure.

The dependent claims are directed to preferred embodiments of the present invention. References used in dependent claims which refer back to claims indicate the further development of the subject matter of the independent claim by the features of the respective dependent claim; they are not to be understood as dispensing with the objective of an autonomous protection of the subject matter for the feature combinations of the referenced dependent claims. Furthermore in respect of an interpretation of the claims for a more detailed specification of a feature in a subordinate claim, it is to be assumed that this type of restriction is not present in the preceding claims in each case.

Comparatively simple mathematical relationships for determination of the absolute position are produced when the measuring element has partial tracks which are dimensioned in accordance with precisely two different grating periods and six scanning heads, of which three are matched in their sensor arrangement to the first of these grating periods and three others are matched in their sensor arrangement to the second of these grating periods.

The solvability of an equation system underlying a determination of the absolute position is favorably influenced if the sequence of the partial tracks and the arrangement of the scanning heads relative to each other and in relation to the sequence of the partial tracks is chosen so that for each of the grating periods a partial track with this grating period is detected by at least one scanning head which corresponds in its sensor arrangement to this grating period.

If two respective scanning heads of a different sensor arrangement are spatially combined, the above-mentioned arrangement can be achieved comparatively simply.

Optionally at least four sensors are assigned to each scanning head to obtain a sufficiently specific equation system for determination of the absolute position of each scanning head.

If, as well as the track, a further track is provided which is embodied as an absolute track, a precise position is also able to be determined within a smaller area, for example within one or more increments of the absolute track. Overall this allows an absolute position to be determined, in that in a first step with the aid of the absolute track a rough position and in a second step with the additional aid of the other track a more precise position is determined. In this case the invention has the advantage that the position within such an area can be determined with a greater accuracy than is possible with only one single incremental track with only one grating period. Compared to the use of two or more such incremental tracks, such as described in DE 41 23 722 A1 for example, the invention has the advantage that only one additional track is needed in addition to the absolute track.

Sensors which feature the measuring element are used in the technical field of machine tools, production machines, robots and the like. The obvious advantage here is the option of a compact design, which comes with the need to only have one track.

Advantageous embodiments of the measurement method are likewise produced for advantageous embodiments of the measuring element and vice versa.

BRIEF DESCRIPTION OF THE DRAWINGS

Exemplary embodiments of the invention are explained below in greater detail with reference to the drawings. Objects or elements which correspond are provided with the same reference symbols in all figures.

The exemplary embodiment or each exemplary embodiment is not to be understood as restricting the invention. Instead numerous changes and modification are possible within the framework of the present disclosure, especially such variants, elements and combinations, which for example can be derived by the person skilled in the art, by a combination or modification of individual features or elements or method steps described in the specific descriptive part as well as in the claims and/or the drawings in respect of the achievement of the object and lead through combinable features to new subject matter or to new method steps or sequences of method steps. In particular the exemplary embodiments are not to be understood as being restricted to the case of rotational movements, since the inventive approaches described here and below are also able to be easily transferred to the case of linear movements.

The figures show

Figure 1:
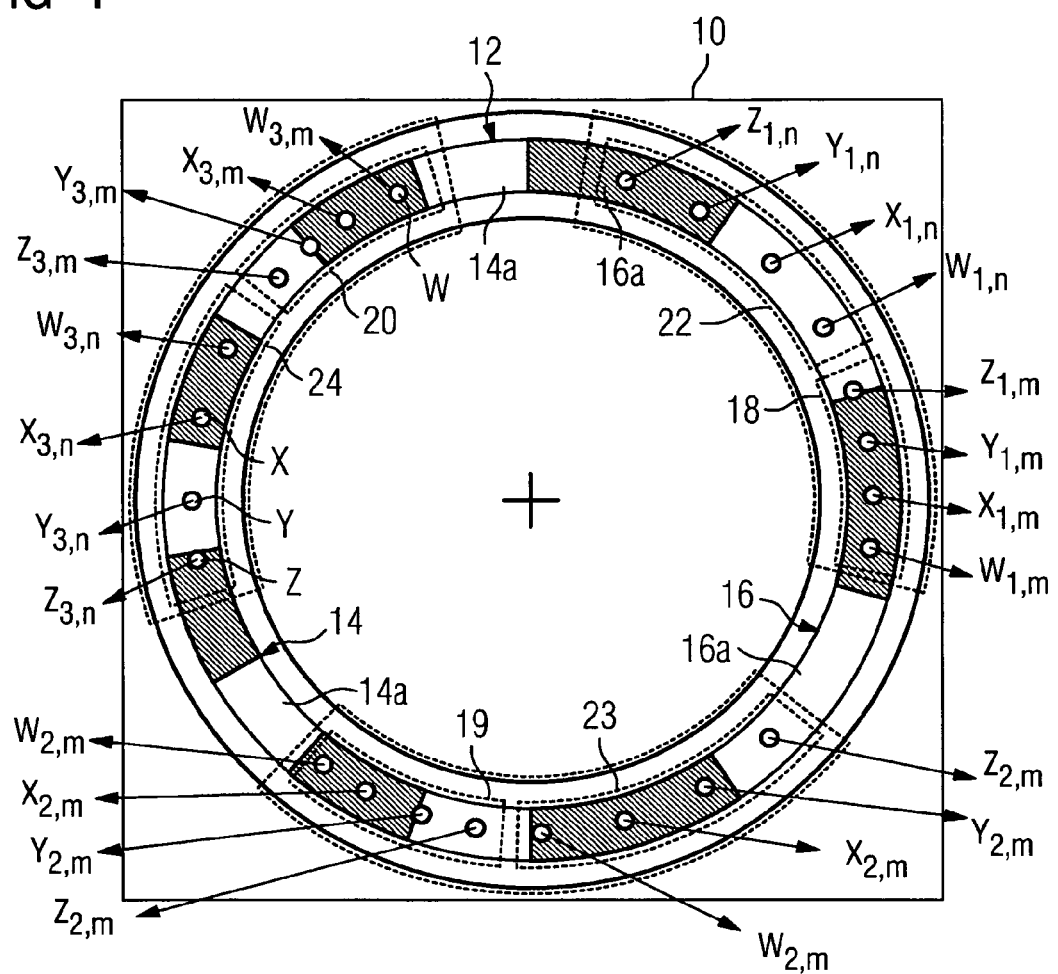

FIG. 1 A measuring element with a circular track comprising a material measure and FIG. 2 a disk with a first and a second track comprising a material measure in each case, as is suitable and intended for use in a measuring element.

DETAILED DESCRIPTION OF INVENTION

Measuring elements with for example two incremental tracks are generally known. Likewise known are the mathematical basics which allow, based on sensors detecting one of the tracks in each case and sensor signals related thereto, for determining a position, for circular, concentric tracks an angle of rotation $\phi$ to be detected, as a relative position relationship between the tracks and sensor/sensors. With two incremental tracks with m or n grating periods for example each incremental track is assigned a scanning head with two sensors in each case. With a similar form of rotational movement of a disk comprising such tracks, each sensor delivers a sine-wave signal, with the two signals of a scanning head in each case being phase-offset by 90°. Depending on the angle of rotation $\phi$ to be detected, this produces the following sensor signals $$x_m(\phi)=A_m\cdot\sin(m\phi+\gamma_m), \quad (10a)$$

$$y_m(\phi)=A_m\cdot\cos(m\phi+\gamma_m), \quad (10b)$$

$$x_n(\phi)=A_n\cdot\sin(m\phi+\gamma_n), \quad (10c)$$

$$x_n(\phi)=A_n\cdot\cos(m\phi+\gamma_n), \quad (10d)$$

with $\gamma m$ and $\gamma n$ being constants which depend on the position of the sensors. In accordance with the sin/cos sensor principle (cf. e.g. DE 27 29 697) $m\phi$ can now be determined from (10a, 10b) and $n\phi$ determined from (10c, 10d) and this can be done as follows:

$$\begin{aligned}m\varphi &= -\gamma_m + a\tan2(y_m, x_m) + k_m\cdot 2\pi \\ &= -\gamma_m + \arg(x_m + j\cdot y_m) + k_m\cdot 2\pi,\end{aligned} \quad (20a)$$

$$\begin{aligned}m\varphi &= -\gamma_m + a\tan2(y_n, x_n) + k_n\cdot 2\pi \\ &= -\gamma_m + \arg(x_n + j\cdot y_n) + k_n\cdot 2\pi.\end{aligned} \quad (20b)$$

In this case "a tan 2(b, a)" and "arg(a+jb)" with real a and b the argument of the complex number a+jb and $k_m$, $k_n$ stand for initially not yet known integers between 0 and m−1 or n−1, i.e.

$k_m \epsilon \{0, 1 \ldots m-1\}$, (30a)

$k_n \epsilon \{0, 1 \ldots n-1\}$. (30b)

After a division of (20a) by m and (20b) by n, the following is produced $$\varphi = -\gamma_m/m + a\tan2(y_m, x_m)/m + k_m \cdot 2\pi/m \quad (40a)$$
$$= -\gamma_m/m + \arg(x_m + j \cdot y_m)/m + k_m \cdot 2\pi/m,$$

$$\varphi = -\gamma_n/n + a\tan2(y_n, x_n)/n + k_n \cdot 2\pi/n \quad (40b)$$
$$= -\gamma_n/n + \arg(x_n + j \cdot y_n)/n + k_n \cdot 2\pi/n.$$

Given the prerequisite that m and n are indivisible, i.e. that the smallest common multiple of m and n is equal to the product of m and n, i.e.

$$kgV(m,n)=m \cdot n, \quad (50)$$

the equation system (40a, 40b) given the ancillary condition (30a, 30b) has precisely one solution. in this case the angle of rotation φ can thus be uniquely determined from the sensor signal $x_m, y_m, x_n, y_n$.

One method for determining the angle of rotation φ is for example as follows:

By equating the two right-hand sides of the equations (40a) and (40b), multiplication by "m n/2π" and transposition the following equation is obtained $$k_m n - k_n m = [n\gamma_m - m\gamma_n + m \cdot a \tan 2\{y_n, x_n\} - n \cdot a \tan 2\{y_m, x_m\}]/2\pi. \quad (52)$$

The right-hand side of the equation (52) is produced by the measured sensor signal $x_m, y_m, x_n, y_n$, and the known variables m, n, $\gamma_m, \gamma_n$. Because of the equality of the left-hand side theoretically an integer is produced here. In practice, as a result of measuring inaccuracies, only an approximate integer will result. Thus the value produced for the right-hand side will be rounded up to the next value. For the equation thus produced the integer solutions $k_m, k_n$ are to be determined using the ancillary condition (30a), (30b). Use in (40a) or (40b) produces the solution for the angle of rotation φ sought. In practice use in (40a) for m>n and use in (40b) for m<n usually produces the more accurate value for the angle of rotation φ sought.

An alternate method for determining φ emerges from WO89/11080. This document describes a method for determining φ from mφ and nφ for the case |m−n|=1, with mφ and nφ being determined in accordance with the sin/cos sensor principle in accordance with equations (20a, b). In a suggested generalization of this method |m−n| φ can be accordingly determined from mφ and nφ also for |m−n|≠1. By iteration of the corresponding generalized method φ can finally be determined for |m−n|≠1.

FIG. 1 shows a schematic simplified presentation of a measuring element 10. The measuring element 10 comprises a track 12, which has a material measure implemented in the form of magnetic or magnetized track segments, referred to below as increments 14a, 16a. In the embodiment of the track 12 shown in FIG. 1 individual increments 14a, 16a are combined respectively into a first and second part 14, 16. Each partial track 14, 16, which is embodied as an incremental track has precisely one grating period of its own. Partial tracks 14, 16 are scanned by sensors W, X, Y, Z provided for determining a position. Sensors W, X, Y, Z are in this case assigned six scanning heads 18, 19, 20, 22, 23, 24 provided for scanning track 12—first, second, third, fourth, fifth and sixth scanning head 18, 19, 20, 22, 23, 24. Each scanning head 18, 19, 20, 22, 23, 24 thus comprises four sensors W, X, Y, Z.

In the example shown in FIG. 1 of a circular track 12 there is provision for the first partial track 14 to have increments 14a, for example in the form of magnetic poles, corresponding to the angular extent ir/m of a grating period of 2π/m and for the or each second partial track 16 to have corresponding increments 16a of the angular extent π/n corresponding to a grating period of 2π/n. A grating period in this sense thus comprises precisely two increments. In conjunction with grating periods of the partial tracks 14, 16 defined in this way there is provision for three scanning heads 18, 19, 20, namely the first, second and third scanning head 18, 19, 20, itself to have a sensor arrangement matched to the grating period of the first partial track 14 and three further scanning heads 22, 23, 24, namely the fourth, fifth and sixth scanning head 22, 23, 24, to have a sensor arrangement matched to the grating period of the second partial track 16.

In FIG. 1 for reasons of clarity an exemplary embodiment with relatively few grating periods, i.e. with relatively small values for m and n is shown (m=9, n=5). In practice however even larger values for m and n are sensible, for example values between 100 and a few 1000.

The sequence of the partial tracks 14, 16 and the arrangement of the scanning heads 18, 19, 20, 22, 23, 24 in relation to each other and with regard to the sequence of the partial tracks 14, 16 are selected so that always at least one of the scanning heads 18, 19, 20, 22, 23, 24 detects precisely one partial track 14, 16, which in its grating period corresponds to the sensor arrangement of the respective scanning head 18, 19, 20, 22, 23, 24.

For the case in which the numerical value of m is greater than the numerical value of n, the result here for the arrangement of sensors W, X, Y, Z, is that these are more densely arranged in the first, second and third scanning head 18, 19, 20 matched to the first partial track 14 than in the or in each fourth, fifth and sixth scanning head 22, 23, 24 matched to the second partial track 16. A scanning head 18, 19, 20, 22, 23, 24 is "matched to a partial track" 14, 16 if the angle between two consecutive sensors W, X, Y, Z of the scanning head 18, 19, 20, 22, 23, 24 corresponds to a half increment 14a, 16a and thereby a quarter grating period of the relevant partial track 14, 16. In the embodiment shown in FIG. 1 two scanning heads 18, 22; 19, 23; 20, 24 are assigned in a spatial grouping in each case to different sensor arrangements, i.e. first and fourth scanning head 18, 22 to the first, second and fifth scanning head 19, 23 to the second and third and sixth scanning head 20, 24 to the third.

The sensors W, X, Y, Z assigned to the respective scanning heads 18, 19, 20, 22, 23, 24 are identified by indexes to reference them uniquely. These relate to the sensor arrangement of the respective scanning head 18, 19, 20, 22, 23, 24 and to scanning heads 18, 19, 20, 22, 23, 24 of the same sensor arrangement, namely first and fourth scanning head 18, 22 to the first, second and fifth scanning head 19, 23 to the second and third and sixth scanning head 20, 24 to the third, i.e.:

$W_{1,m}, X_{1,m}, Y_{1,m}, Z_{1,m}$ (first scanning head 18);
$W_{2,m}, X_{2,m}, Y_{2,m}, Z_{2,m}$ (second scanning head 19);
$W_{3,m}, X_{3,m}, Y_{3,m}, Z_{3,m}$ (third scanning head 20);
$W_{1,m}, X_{1,m}, Y_{1,m}, Z_{1,m}$ (fourth scanning head 22);
$W_{2,m}, X_{2,m}, Y_{2,m}, Z_{2,m}$ (fifth scanning head 23) and
$W_{3,m}, X_{3,m}, Y_{3,m}, Z_{3,m}$ (sixth scanning head 24).

Sensor signals w, x, y, z delivered by the sensors W, X, Y, Z are identified by lower case letters in compliance with the referencing of sensors W, X, Y, Z as follows:

$w_{1,m}(\phi), x_{1,m}(\phi), y_{1,m}(\phi), z_{1,m}(\phi)$;
$w_{2,m}(\phi), x_{2,m}(\phi), y_{2,m}(\phi), z_{2,m}(\phi)$;
$w_{3,m}(\phi), x_{3,m}(\phi), y_{3,m}(\phi), z_{3,m}(\phi)$;
$w_{1,n}(\phi), x_{1,n}(\phi), y_{1,n}(\phi), z_{1,n}(\phi)$;

$w_{2,n}(\phi), x_{2,n}(\phi), y_{2,n}(\phi), z_{2,n}(\phi)$ and
$w_{3,n}(\phi), x_{3,n}(\phi), y_{3,n}(\phi), z_{3,n}(\phi)$;

If the sensor arrangement of one of the scanning heads 18, 19, 20, 22, 23, 24, which delivers with its sensors W, X, Y, Z the signals $W_{k,q}(\phi), x_{k,q}(\phi), y_{k,q}(\phi), z_{k,q}(\phi)$ ($k \in \{1,2,3\}$; $q \in \{m, n\}$), is located completely over a partial track 14, 16, the sensor signals w, x, y, z for a grating period of the respective partial track 14, 16 of $2\pi/q$ result in:

$$w_{k,q}(\phi) = -A_{k,q} \cdot \sin(q\phi + \gamma_{k,q}), \quad (60a)$$

$$x_{k,q}(\phi) = A_{k,q} \cdot \cos(q\phi + \gamma_{k,q}), \quad (60b)$$

$$y_{k,q}(\phi) = A_{k,q} \cdot \sin(q\phi + \gamma_{k,q}), \quad (60c)$$

$$z_{k,q}(\phi) = -A_{k,q} \cdot \cos(q\phi + \gamma_{k,q}). \quad (60d)$$

Whether the respective scanning head 18, 19, 20, 22, 23, 24 is in this case completely over a partial track 14, 16 corresponding to its sensor arrangement, can be seen from the decision signals $S_{A;k,q}$, $S_{B;k,q}$ formed from the above sensor signals w, x, y, z. In such cases these are formed for each scanning head 18, 19, 20, 22, 23, 24 as follows:

$$S_{A;k,q} = w_{k,q}(\phi) + y_{k,q}(\phi)$$

and $$S_{B;k,q} = w_{k,q}(\phi) + z_{k,q}(\phi).$$

In this case the decision signals $S_{A;k,q}$ and $S_{B;k,q}$
for k=1 and q=m relate to the first scanning head 18,
for k=2 and q=m to the second scanning head 19,
for k=3 and q=m to the third scanning head 20,
for k=1 and q=n to the fourth scanning head 22,
for k=2 and q=n to the fifth scanning head 23,
for k=3 and q=n to the sixth scanning head 24, If the first and the second decision signal $S_{A;k,q}$, $S_{B;k,q}$ simultaneously (within certain predetermined or predeterminable tolerances) satisfy a predetermined or predeterminable criterion, e.g. such that first and second discriminating signal $S_{A;k,q}$, $S_{B;k,q}$ disappear or remain proportionately at least below a predetermined or predeterminable threshold value, a position is detected in relation to the respective scanning head 18, 19, 20, 22, 23, 24 in which the latter is completely over a partial track 14, 16, which in its grating period corresponds to the sensor arrangement of the respective scanning head 18, 19, 20, 22, 23, 24. The scanning head 18, 19, 20, 22, 23, 24 is thus located precisely over a "suitable" partial track 14, 16.

With a suitable sequence of partial tracks 14, 16 and suitable arrangement of the scanning heads 18, 19, 20, 22, 23, 24 in relation to each other and with regard to the sequence of the partial tracks 14, 16 it is now the case that one of the scanning heads 18, 19, 20 which deliver the sensor signal $W_{k,m}(\phi), x_{k,m}(\phi), y_{k,m}(\phi), z_{k,m}(\phi)$ $k \in \{1, 2, 3\}$ always, i.e. regardless of the angle of rotation $\phi$, lies over an "appropriate" partial track 14, and likewise one of the scanning heads 22, 23, 24 which deliver the sensor signals $W_{k,n}(\phi), X_{k,n}(\phi), y_{k,n}(\phi), z_{k,n}(\phi)$ $k \in \{1, 2, 3\}$ lies over an "appropriate" partial track 16. This means that the angle of rotation $\phi$, can be determined as follows, especially by analogous application of the relationships described at the outset:

1. Determine scanning heads 18, 19, 20, 22, 23, 24, which lie over the respective partial track 14, 16 appropriate to them. i.e. determine k m and k n with $$w_{k\,m,m}(\phi) + y_{k\,m,m}(\phi) = x_{k\,m,m}(\phi) + z_{k\,m,m}(\phi) = 0, \quad (70a)$$

$$w_{k\,n,n}(\phi) + y_{k\,n,n}(\phi) = x_{k\,n,n}(\phi) + z_{k\,n,n}(\phi) = 0, \quad (70b)$$

with in practice instead of "=0" the checking were to be applied in relation to the above-mentioned threshold value.

2. Since this means that for $y_{k\,m,m}(\phi), x_{k\,m,m}(\phi)$ in accordance with (60c, 60b) equations of the same form apply as the equations (10a, 10b) for $x_m(\phi), y_m(\phi), x_n(\phi), y_n(\phi)$ in the prior art, variables can also be determined from these in accordance with the angle of rotation $\phi$. The redundancy provided by the additional equations (60a, 60d) can be used in the practical application for interference suppression.

Methods already basically known in the prior art for track signal correction are also able to be used in principle within the context of the inventive approach. However in such cases the following must be considered: Depending on the k m or k n for which the condition (70a, 70b) is fulfilled, different sensor signals w, x, y, z will be evaluated for position determination. In such cases there are ranges of the angle of rotation $\phi$ for which for the evaluation of the equations (40a) and (40b) respectively, both sets of sensor signals w, x, y, z can be used. Ranges for which only the one or the other set can be used, are always separated with a suitable arrangement by areas in which both sets are able to be used. On this basis known correction methods can be employed which require that for the correction of the sensor signals w, x, y, z at a specific point in time or at a specific position, these have already been determined in a directly preceding time segment or a directly preceding position, especially a directly preceding angular range.

In the exemplary embodiment described above a configuration is selected for which each scanning head 18, 19, 20, 22, 23, 24 with its sensor arrangement always only "fits" the partial tracks 14, 16 at precisely one grating period. However facilities can also be presented in which one scanning head "fits" two or more different grating periods. This is the case with two different grating periods $2\pi/m$ and $2\pi/n$ for example if there are non-negative whole numbers $p_m, p_n$, for which $$(p_m + 1/4)2\pi/m = (p_n + 1/4)2\pi/n$$

applies. This is the case for example for m=9, n=5 with $p_m=2$ and $p_n=1$. If $$\delta = (p_m + 1/4)2\pi/m = (p_n + 1/4)2\pi/n$$

is selected under these circumstances as an intermediate angle of two consecutive sensors within a scanning head 18, 19, 20, 22, 23, 24, then such a scanning head for partial tracks "fits" both the grating period $2\pi/m$ and also the grating period $2\pi/n$. Provided exclusively these two grating periods occur and exclusively scanning heads 18, 19, 20, 22, 23, 24 with the said intermediate angle 6 between two consecutive sensors W, X, Y, Z, the formation of the above-mentioned decision signals is thus superfluous, so that only two sensors are needed per scanning head 18, 19, 20, 22, 23, 24. However it should also be considered that it can then no longer be deduced from the sensor signals which grating period the partial track currently located below the scanning head 18, 19, 20, 22, 23, 24 has.

It is also possible, instead of scanning heads 18, 19, 20, 22, 23, 24 of the type previously described which correspond to the basic principle of the sin/cos sensor, to use other types of scanning heads, as are described in the German publication "Verfahren und Vorrichtung zur Positionsmessung mit mehr als zwei Sensoren (Method and facility for position measurement with more than two sensors)", www.ip.com, IPCOM000035541D, Roland Finkler, Hans-Georg Köpken. Scanning heads of this type are also able to be embodied so that on the one hand they are appropriate for two or more different grating periods of partial tracks and on the other hand decision signals can be formed from the sensor signals which allow a decision value as to whether the respective scanning head is completely above a partial track, and if it is, which grating period this partial track has.

A disk 30 is shown in FIG. 2 which comprises a first track 12 of the type shown in FIG. 1. In addition to this track 12 the disk 30 has a further track 32 which will always be referred to below as the further track 32 in order to distinguish it from the first track 12.

The first track 12 in accordance with FIG. 2 is produced from the track 12 in FIG. 1 e.g. by the latter being processed in a linear manner and compressed by a factor of three. Three examples of the compressed version are arranged next to each other and this arrangement is finally processed to form an annular track, i.e. the first track 12. Corresponding to the exemplary embodiment in accordance with FIG. 1 a corresponding scanning of the first track 12 from FIG. 2 allows the position to be determined within a ⅓ rotation. The further track 32 functioning as an absolute track consists of a number of increments 32a, the "lengths" or angular extent of which, i.e. the arc length of an angle exactly encompassing one of the respective increments 32a, all amount to a respective whole-number multiple of a common basic length. In the example shown in FIG. 2 this common basic length amounts to a ⅙ rotation.

Like FIG. 1, for reasons of clarity, FIG. 2 also depicts an example with relatively few increments 14a, 16a; 32a on the first or the further track 12, 32. In practice facilities with significantly more increments 14a, 16a; 32a, for example between 100 and a few 1000, are sensible.

With the further track functioning as an absolute track 32, as is described for example in EP 0 530 176 A1, basically it is possible to determine a position within one rotation, with the accuracy however only corresponding to the said common basic length of the grating elements, i.e. about ⅙ rotation in the example shown in FIG. 2. The accuracy actually achievable is practice slightly worse as a result of tolerances and measuring errors. The first track 12 functioning as a "nested incremental track" according to the embodiment for FIG. 1 however a more precise determination of a position within a position interval obtainable by evaluation of the further track 32 (absolute track).

In order to obtain a sufficient resolution or accuracy for a combination of one absolute track, i.e. the further track 32 for example and only one incremental track, i.e. first track 12, in the prior art the grating period of the incremental track must be sufficiently small. On the other hand this grating period must be at least as large as the position interval able to be determined with reference to the absolute track, or better even larger, e.g. twice as large. The size of this position interval is limited downwards for technical reasons, for example because of tolerances in the placing of the sensors provided for the scanning of the absolute track. For this reason the prior art uses known measuring elements, which for position determination are based on the evaluation of at least one absolute track, frequently two incremental tracks, as is described in DE 41 23 722 A1. As a result of the increased space requirement of a disk with three tracks, namely the absolute track and two incremental tracks, such a solution is less than optimum.

The embodiment described above and presented in FIG. 2 of a combination of the first track 12 with a further track 32 embodied as an absolute track thus represents a further aspect of the invention with an autonomously inventive character. The track 12 functioning as the incremental track combines two incremental scales, so that instead of the two incremental tracks required in the prior art in conjunction with one absolute track for a comparable accuracy, the type shown in FIG. 1 is sufficient. Resolution and accuracy in this case are only restricted by the smaller of the grating periods.

Thus the invention can be briefly presented as follows: A measuring element 10 with a circular or linear track 12 comprising a material measure and a number of sensors provided for scanning the track 12 is specified, in which at least two scanning heads 18, 19, 20; 22, 23, 24 comprising the sensors are provided for scanning the track 12. In the measuring element 10 the track 12 comprises at least one first and one second partial track 14, 16 with a first and a second grating period respectively. For each grating period occurring one of the scanning heads 18, 19, 20; 22, 23, 24 then has a sensor arrangement matched to this grating period.

The invention claimed is:

1. A measuring element, comprising:
a first track with a material measure, the first track having a first partial track with a first grating period and a second partial track with a second grating period;
a plurality of sensors for scanning the first track; and
at least two scanning heads having the sensors for scanning the first track,
wherein for each grating period, one of the scanning heads has a sensor arrangement matched to the grating period,
wherein the measuring element comprises six scanning heads.

2. The measuring element as claimed in claim 1, wherein a first, a second and a third scanning head are matched to the first grating period of the first partial track representing a first sensor arrangement, and
wherein a fourth, a fifth and sixth scanning head are matched to the second grating period of the second partial track representing a second sensor arrangement.

3. The measuring element as claimed in claim 2, wherein a sequence of the first and the second partial track and an arrangement of the scanning heads are selected relative to each other and in relation to the sequence of the first and second partial track such that at least one of the six scanning heads detects precisely the first or second partial track, the partial track corresponding in its grating period to the sensor arrangement of the respective scanning head.

4. The measuring element as claimed in claim 2, wherein two out of the six scanning heads are combined spatially, and wherein one scanning head is selected from the first sensor arrangement and the other scanning head is selected from the second sensor arrangement.

5. The measuring element as claimed in claim 1, wherein a sequence of the first and the second partial track and an arrangement of the scanning heads are selected relative to each other and in relation to the sequence of the first and second partial track such that at least one of the six scanning heads detects precisely the first or second partial track, the partial track corresponding in its grating period to the sensor arrangement of the respective scanning head.

6. The measuring element as claimed in claim 5, wherein two out of the six scanning heads are combined spatially, and wherein one scanning head is selected from the first sensor arrangement and the other scanning head is selected from the second sensor arrangement.

7. The measuring element as claimed in claim 1, wherein the at least two scanning heads each comprise four sensors.

8. The measuring element as claimed in claim 1, wherein the sensor arrangement of one of the at least two scanning heads matches to the first and second grating periods.

9. The measuring element as claimed in claim 8, wherein the sensor arrangement of the one scanning head, which features flail the sensor arrangement matched to the first and second grating period, issues sensor signals and issues decision signals based upon the sensor signals, the decision signals allowing a decision to be taken as to whether the scanning head is located completely above a partial track and which grating period this partial track has.

10. The measuring element as claimed in claim 1, further comprising:
   a second track embodied as an absolute track.

11. A sensor, comprising:
   a measuring element with
      a first track with a material measure, the first track having a first partial track with a first grating period and a second partial track with a second grating period,
      a plurality of sensors for scanning the first track, and
      at least two scanning heads having the sensors for scanning the first track,
      wherein for each grating period, one of the scanning heads has a sensor arrangement matched to the grating period, and
      wherein the measuring element comprises six scanning heads.

12. The sensor as claimed in claim 11, wherein the sensor is arranged in a machine tool, production machine or robot.

13. A method of operation of a measuring element, comprising:
   providing a first track with a material measure, the first track having a first partial track with a first grating period and a second partial track with a second grating period;
   scanning the first track by a first and a second scanning head having sensors for scanning the first track,
   wherein for each grating period, the first scanning head has a first sensor arrangement matched to the first grating period, and wherein the second scanning head has a second sensor arrangement matched to the first and second grating period;
   issuing sensor signals by the second sensor arrangement matched to the first and second grating period;
   issuing decision signals based upon the sensor signals from the second sensor arrangement;
   evaluating the decision signals in relation to fulfilling predetermined criteria; and
   providing a second track embodied as an absolute track.

14. The method as claimed in claim 13, wherein the measuring element comprises six scanning heads.

15. The method as claimed in claim 14, further comprising:
   matching a first, a second and a third scanning head to the first grating period of the first partial track representing the first sensor arrangement; and
   matching a fourth, a fifth and sixth scanning head to the second grating period of the second partial track representing the second sensor arrangement.

16. The method as claimed in claim 13, wherein a sequence of the first and second partial track and an arrangement of the scanning heads are selected relative to each other and in relation to the sequence of the first and second partial track such that at least one of the six scanning heads detects precisely the first or second partial track, the partial track corresponding in its grating period to the sensor arrangement of the respective scanning head.

17. The method as claimed in claim 13, further comprising:
   arranging the measuring element in a machine tool, production machine or robot.

* * * * *